United States Patent [19]

Petersen

[11] Patent Number: 4,627,772

[45] Date of Patent: Dec. 9, 1986

[54] CARVING ATTACHMENT FOR TABLE SAWS

[75] Inventor: Paul S. Petersen, Minnetonka, Minn.

[73] Assignee: Newmark, Inc., Minneapolis, Minn.

[21] Appl. No.: 643,658

[22] Filed: Aug. 23, 1984

[51] Int. Cl.$^4$ ............................................. B23D 45/02
[52] U.S. Cl. ...................................... 409/121; 142/7; 144/144 R; 144/154; 409/124
[58] Field of Search .................. 409/87, 88, 89, 92, 409/93, 110, 111, 112, 115, 121, 122, 123; 51/97 R, 97 NC, 101 R; 144/145 R, 154, 137, 143, 145 A, 145 B, 145 C; 142/37, 7

[56] References Cited

U.S. PATENT DOCUMENTS

| | | | |
|---|---|---|---|
| 271,702 | 2/1883 | Griggs | 142/48 X |
| 2,819,741 | 1/1958 | Clausing | 142/7 |
| 2,847,044 | 8/1958 | Anderson | 144/154 |
| 3,211,061 | 10/1965 | Cretsinger | 90/13.1 |
| 3,255,791 | 6/1966 | Garraffa | 142/7 X |
| 3,512,561 | 5/1970 | Cortez | 142/37 |
| 3,864,879 | 2/1975 | Naismith | 51/101 R |
| 4,000,766 | 1/1977 | Sutcliffe | 409/111 X |
| 4,078,474 | 3/1978 | Laskowski | 90/13.3 |
| 4,227,557 | 10/1980 | Allen | 142/7 |
| 4,288,185 | 9/1981 | Lenz | 409/121 |
| 4,364,695 | 12/1982 | Lenz | 409/103 |

FOREIGN PATENT DOCUMENTS 449385 9/1927 Fed. Rep. of Germany .......... 142/7

OTHER PUBLICATIONS

Declaration of Chuck Hetland.
Declaration of Donald L. Buck.
Declaration of Paul S. Petersen.

*Primary Examiner*—Gil Weidenfeld
*Assistant Examiner*—Glenn L. Webb
*Attorney, Agent, or Firm*—Kinney & Lange

[57] ABSTRACT

A wood carving attachment that mounts onto a table saw provides a carriage for holding a pattern, and a workpiece that will be engaged by the circular saw blade to duplicate the pattern configuration on the workpiece. The pattern and workpiece are mounted on opposite ends of a carriage that pivots about an rocker axis generally parallel to the axis of rotation of the saw blade, and also is movable in direction along the axis and at the same time the pattern and the workpiece are both rotated about axes generally parallel to the rotational axis of the saw blade. A tracer wheel riding against the pattern will cause the carriage to be tilted about its rocker axis of the support as the pattern is moved along the rocker axis and rotated against the follower wheel so that by movement of the carriage the surface configuration of the pattern is duplicated by the saw blade engaging the workpiece. The pattern tracer wheel is on the opposite side of the rocker axis from the saw blade and controls the movement of the workpiece relative to the saw blade as guided.

16 Claims, 6 Drawing Figures

CARVING ATTACHMENT FOR TABLE SAWS

BACKGROUND OF THE INVENTION

1. Field of the Invention.

The present invention relates to carving attachments, and specifically to a carving attachment which mounts onto a table saw so the saw blade is used to carve a workpiece conforming to the shape of a pattern.

2. Description of the Prior Art

In the prior art, there have been various carving machines which have router bits that rotate and will carve a workpiece, in many instances more than one work piece, while a follower follows a pattern held relative to the workpieces.

Examples of such devices include U.S. Pat. Nos. 4,078,474; 4,227,557, and 4,364,695. In these patents the carver tool lies above the workpiece and the pattern follower also lies above the patterns. U.S. Pat. No. 4,288,185 shows a carver having the tool and pattern follower vertically stacked.

Also, U.S. Pat. No. 3,211,061 shows an attachment that converts a radial arm saw into a carver or router, and which has a follower for a pattern and a router that follows the trace of the pattern. The motor supports for the radial arm saw are used for obtaining the necessary motions for three-dimentional carving.

SUMMARY OF THE INVENTION

The present invention relates to a carving attachment for a table saw that mounts easily onto the saw table top, and carries a rocking carriage that pivots about a rocker axis that is generally parallel to the axis of rotation of the saw, or in other words generally transverse to the saw blade plane. The carriage has two parallel arms forming a headstock and a tailstock that have ends extending on opposite sides of the rocker axis, and a pattern to be duplicated or carved is mounted between first ends of the arms. At the opposite ends of the arms, and on the opposite side of the rocker axis, a workpiece is held between the arms. Both the pattern and the work piece can be rotated about axes parallel to the tilting or rocker axis using a crank, and at the same time, the carriage is moved in direction along the rocker axis. A tracer wheel that has its rotational axis fixed relative to the saw table rides against the pattern, and causes the carriage to tilt about its tilting or rocker as it follows the pattern. The carriage is mounted on the saw so that the workpiece will be engaged by the saw blade, and thus as the pattern is rotated and moved axially along with the carriage, the configuration of the pattern will cause the carriage to rock or tilt as the tracer wheel follows the pattern surface, causing the pattern configuration to be duplicated by the saw blade on the workpiece.

The unit is made so that is mounts onto the saw table with the pattern tracer wheel and carriage positioned above the table and thus in full view of an operator.

The carriage can be adjusted to receive workpieces of different lengths. The differential radius (from the largest radius cut to the smallest radius cut) of the workpiece that can be cut or carved is limited by the amount that the saw blade protrudes above the table surface.

The drive between the rotating pattern and the workpiece as shown is a simple chain drive. The rotational drive and the movement of the pattern and workpiece in direction along the rocker axis, that is transverse to the saw blade, is controlled with a hand crank as shown. The crank drives a traveling lead screw that mounts through a nut that is supported in a fixed location relative to the saw table, so that as the screw is rotated, the screw will move along its length relative to the nut carrying the carriage with it, and at the same time permitting the carriage to tilt under the control of the tracer or follower wheel that follows the pattern to cause the work piece to be cut properly. The nut used with the lead screw is a nut that can be split, using a cam actuator, to permit the carriage to be initially positioned rapidly and then positively moved and driven when a carving action is desired.

The workpiece is moved sideways across the saw blade at the same time it is rotating so that the saw path of travel on the workpiece drscribes a spiral path, the lead of which is controlled by the drive components including the ratio of rotation of the pattern and work piece relative to the axial movement of the lead screw.

The follower wheel also is made so that is has a reliable, rigid construction and to insure accurate duplication of the pattern configuration on the workpiece.

DETAILED DESCRIPTION OF THE PREFERRED EMBODIMENTS

Figure 1:
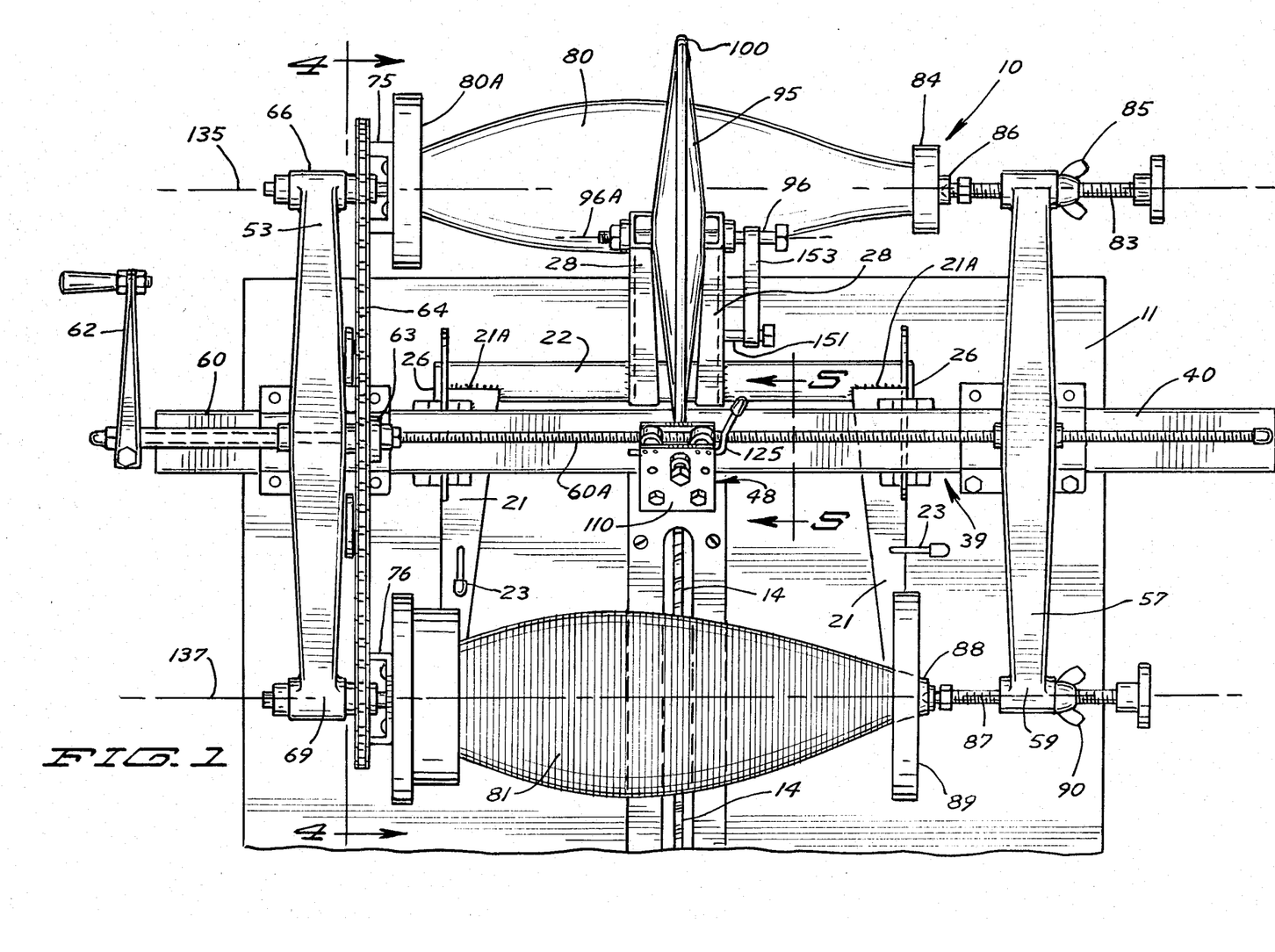
FIG. 1 is a top plan view of a carving attachment made according to the present invention.

A carving attachment indicated generally at 10 in FIG. 1 is made to mount onto the table 11 of a table saw of conventional design. the table 11 has an upper surface shown at 12, and has a support frame that rotatably supports a saw blade 14 of conventional design. The saw blade is made to rotate about an axis indicated at 15 in direction as indicated by the arrow 16 under power in a normal manner. The saw motor is represented schematically at 17, in that it is a conventional table saw on which the attachment 10 is mounted.

A base assembly 20 having a pair of mounting feet 21,21 joined with a cross member 22 is placed in a desired location on the table saw and is held.

The feet are formed members that have an elongated surface that rest on the saw table top 12. The feet 21 and cross piece 22 are held as an assembly onto the table top with suitable clamping screws indicated at 23 which are threaded directly into tapped holes in the saw table top. The clamp screw 23 has a shoulder that bears against a support wall 24 below the upper flanges 21A of each foot (see FIG. 2) as the screw is threaded into the table top to tightly clamp the feet in position holding the cross piece 22 at a desired location.

Cross member 22 is a torque tube that is welded to the feet 21, and to the upper flanges 21A which extend along the top edge of the feet. This gives a very rigid assembly, and at the opposite ends of the support base. A pair of rocker brackets 26,26 are fixed to the feet on opposite ends of the base. The rocker brackets 26 thus are fixed relative to the table by the base. In the center portions of the cross piece or torque tube 22, there are a pair of upright wheel mounting bracket legs indicated at 28, which are spaced apart and extend upwardly. These also are fixed relative to the table, and as will be explained, are used for supporting a pattern tracer wheel.

Figures 5, 6:
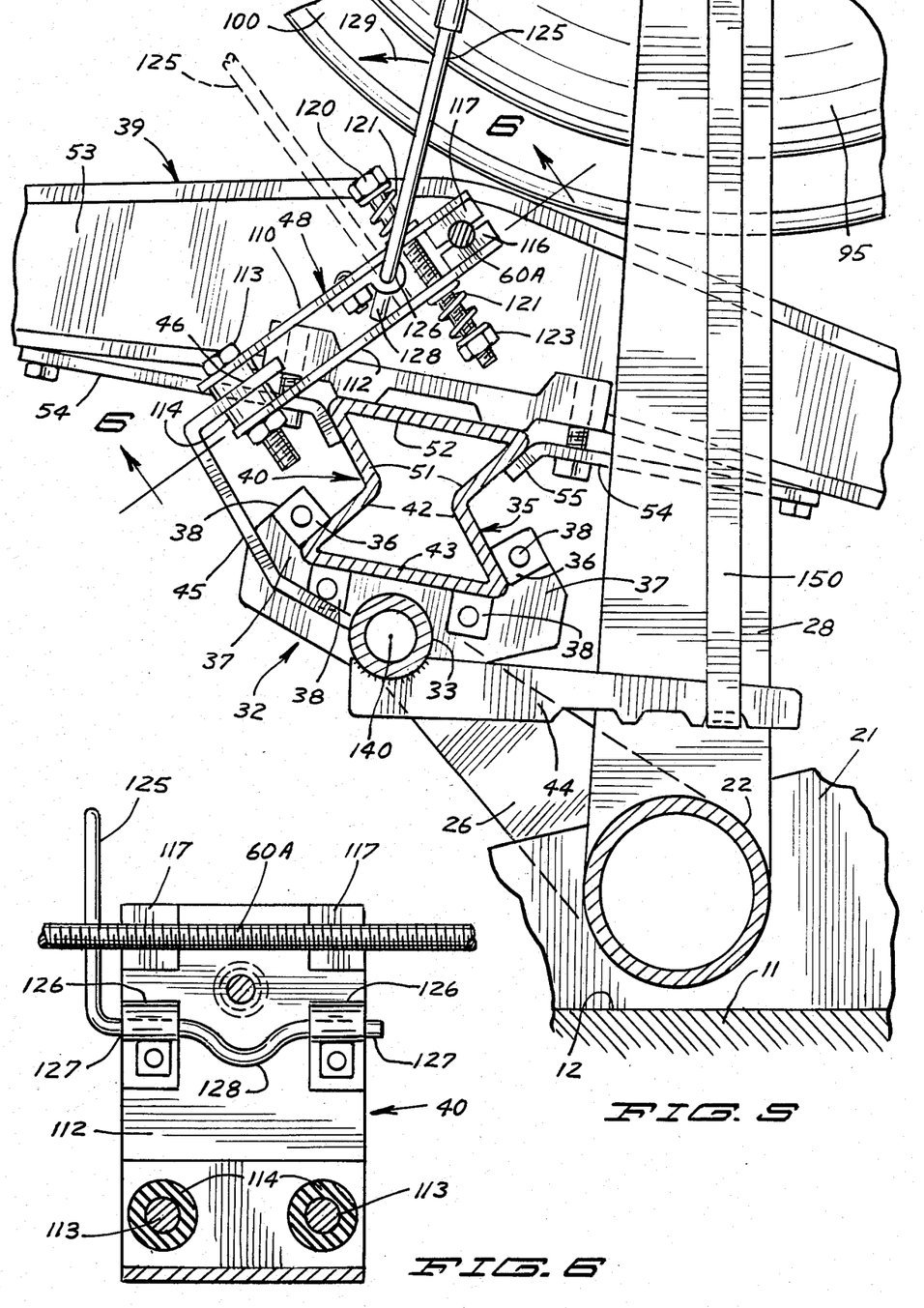
FIG. 5 is a sectional view taken as on line 5—5 in FIG. 1, and enlarged to show the details of construction.
FIG. 6 is a sectional view taken as on line 6—6 in FIG. 5.

The rocker brackets 26 have apertures at the upper ends which receive pivot pins 29, and these pivot pins 29 in turn are used for pivotally supporting a rocker assembly indicated generally at 32 therebetween. The rocker assembly comprises a cross tube 33 as shown in FIG. 5, and at the ends of the cross tube, there are slider brackets 34,34. The slider brackets 34,34 are spaced apart in direction transverse to the saw blade and are shaped to form an upwardly open recess 35 at the upper sides thereof. Recess 35 has undercut end portions indicated generally at 36,36 that are formed by inwardly turned retainer members 37. There are low friction slider bearing members 38 on the lower edge of the recess and also on the ends of the inwardly turned retainer member 37. Each of the brackets 34 is adapted to slidably receive and retain a carriage assembly 39 which includes a torque tube indicated generally at 40 that has a cross section configuration that mates with this recess 35 so that the torque tube is slidable along the slider bearings 38. The torque tube 40 has inwardly formed side walls that are deformed in shallow "V" configurations, so that the lower portion of the torque tube 40 formed by the wall portions 42 and a bottom wall 43 are retained in these slider brackets 34 by the slider bearings 38. The torque tube cannot be lifted out of the brackets because the wall 43 is wider than the open top of the brackets and fits below the inwardly turned retainer members 37.

Slider bearings 38 can be adjustable so that they bear against the torque tube surfaces with the desired amount of clearance and permit free sliding of the torque tube 40 in direction along the axis of the torque tube.

The cross tube 33 of the rocker bracket has a control arm 44 extending laterally therefrom, and positioned on one side of the upright wheel support brackets 28. A support arm 45 is fixed to the cross tube 33 of the rocker bracket, and is formed to pass around the torque tube 40, and, as shown in FIG. 5, has an upwardly extending leg 46 that supports a split nut assembly 48. Split nut assembly is used as a nut for a drive or lead screw that is used for moving the torque tube 4 relative to the slider brackets 34, as will be explained.

Torque tube 40 has an upper section formed by side wall portions 51 that form part of the "V" side wall sections and which are connected to an upper wall 51. The upper side of the torque tube has outwardly protruding corner portions which are used for clamping supports in place on the torque tube. A headstock arm indicated generally at 53, comprising an elongated arm, is clamped to the upper wall 52 of the torque tube 40 in a suitable manner, for example, by the use of clamps indicated at 54 in FIG. 2, and these clamps 54 have end portions 55 which bear against the side walls 51 of the torque tube 40 and tightly clamp the headstock 53 at a desired location along the length of the torque tube. There can be any desired number of the clamps, to hold the headstock tightly in place.

At a location spaced along the longitudinal axis of the torque tube 40, which comprises a portion of the carriage assembly 39, there is a tailstock arm 57 that is supported on the upper wall 51 of the torque tube in the same manner as the headstock. The tailstock is clamped into position with suitable clamps 54 as previously explained.

The relative positions of the tailstock and headstock will depend upon the length of the workpiece and pattern that are to be accomodated therebetween, but the headstock will usually be placed close to one end of the torque tube 40.

The headstock carries a lead screw 60 that is rotatably mounted in the center portion of the headstock in a suitable manner and has a threaded portion indicated at 60A that passes through the split nut assembly 48. The screw 60 is also rotatably mounted in an opening in the center portion of the tailstock. It can be seen in FIG. 1 that the lead screw threaded portions 60A extend through the tailstock and the tailstock will have suitable bearings for holding the lead screw 60 so that it will freely rotate with respect to the tailstock. The screw 60 is held from longitudinal movement relative to the headstock and tailstock by thrust bearings at the headstock.

It can be seen that the bracket 45, the head and tailstock arms, the torque tube, and the parts carried thereby comprise the carriage 39 and they pivot as a unit about the pivot axis of the pivot support pin 29, which extends transverse to the saw blade 14. In order to provide for adequate tooth clearance on the saw blade, the pivot axis of the pins 29 forming the carriage rocker axis is skewed slightly with respect to the rotational axis of the saw blade, as shown approximately 3° counterclockwise as seen in FIG. 1. The relationship is that the rocker axis and saw blade axis are generally parallel and skewed only subject to provide tooth clearance for cutting action of the saw blade. Thus the term direction transverse to the saw blade will mean generally along the axis of the saw blade, and any reference to axes that rotate parallel to the saw blade also are meant to be within the parameter of "generally parallel" and accommodating saw blade tooth clearance. Of course, it can be seen in FIG. 2 that movement about the axis of the pins 29, forming the rocker axis causes the respective ends of the headstock and tailstock to move up and down relative to the table surface 12 in opposite directions because the opposite ends are on opposite sides of the rocker axis.

Figure 4:
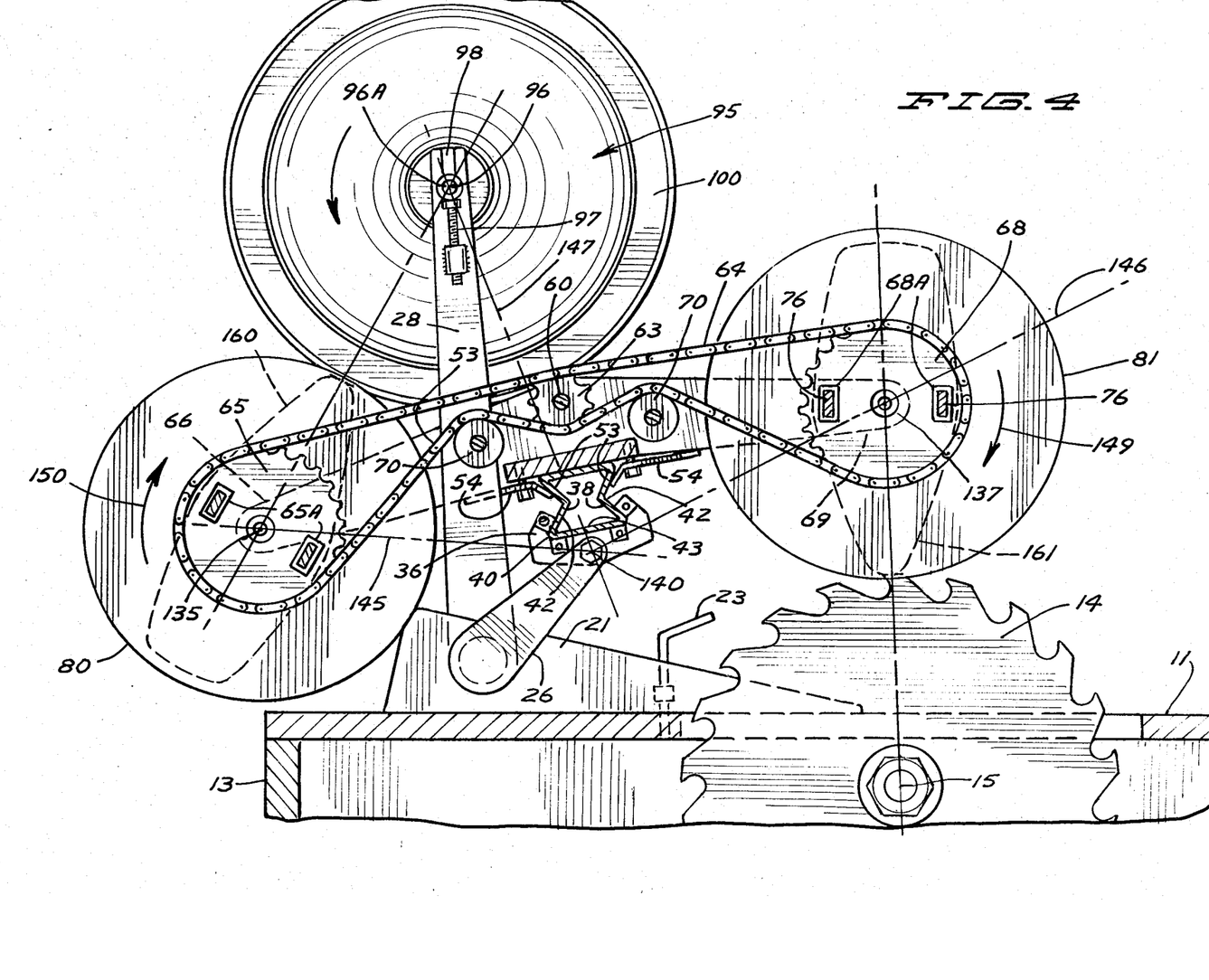
FIG. 4 is a sectional view taken as on line 4—4 in FIG. 1.

A crank handle 62 is mounted onto the end of the lead screw 60 adjacent the headstock and when the crank is turned, and the threaded part 60A is engaged with the split nut 48, the screw will move relative to the nut and will slide the carriage assembly including the torque tube 40 and the head and tailstocks, axially along the slider bearings 38 relative to the rocker brackets 34. Specifically, also, the crank is used as a rotational drive for driving both a workpiece and a pattern simultaneously. As shown in FIG. 4, the screw 60 has a sprocket 63 drivably mounted thereon adjacent to the headstock 53, and sprocket 63 in turn drives a chain 64. There is a pattern drive sprocket 65 at the pattern end 66 (or first end) of the headstock arm 53, and there is a workpiece drive sprocket 68 at the work piece end 6 (or second end) of the headstock.

The chain 64 is passed over a pair of idlers 70,70 which are positioned to keep the chain suitably tight, and also to guide the chain so that it clears the portions of the headstock arm 53 that are used for clamping the arm to the torque tube.

The tailstock arm 57 has a pattern end 58 (or first end), and a workpiece end 59 (or second end) that correspond in relative position to the pattern end and workpiece end of the headstock so the respective ends of the headstock and tailstock align.

The sprockets 65 and 68 each have apertures 65A and 68A, respectively for driving a pattern and the workpiece respectively. For example, the apertures 65A in sprocket 65 will receive the legs of a U shaped drive lug 75, which has its base fixed to the end of a pattern indicated generally at 80. The pattern 80 has an end flange 80A that supports the drive bracket 75. The apertures 68A of sprocket 68 receive the legs of a drive bracket 76, which is mounted on an end of a workpiece indicated generally at 81 that is positioned between the headstock and tailstock at the workpiece ends 66 and 69 of the tailstock and headstock respectively. The workpiece 81 is selected in size to permit reproducing the pattern use.

The sprockets 65 and 68 are rotatably mounted on suitable shafts and bearings at the respective ends 66 and 69 of the head stock in a normal manner that makes them free turning and self-supported, so that the chain movements 64 will cause rotation of the sprockets.

The tailstock end portions 58 and 59 have hubs that are threaded to receive adjustment screws. For example, at the pattern end 68 there is an adjustment screw 83 that is threaded through the end portion 58 of the tailstock. The screw 83 has a cone point end that will engage center attachment 86 which is pounded into an end flange 84 of the pattern 80, so that it will engage center attachment 86 which headstock and tailstock in a normal manner. A lock nut 85 can be provided for locking the screw 83 once the pattern is securely held.

The center 86 is a suitable support member, which will be engaged at the cone point end of the support screw 83 and will permit the pattern to rotate freely on the point of the support screw.

At the workpiece end 59, there is a support screw 87 threadably mounted in the end portion 58, generally coaxial with the axis of rotation of the sprocket 68, and screw 87 is threaded through the end portion of the tailstock arm 57 and also has a cone point end that engages a center member 88 which is held in an end flange 89 of the workpiece 81. A lock nut 90 may be used for locking the screw 87 in position once it has been adjusted to securely hold the workpiece.

In order to control the radial configuration to be cut in the workpiece the rocking motion of the rocker frame, including the headstock, tailstocks and the carriage torque tube that supports them, to follow the outer configuration of the pattern 80, a pattern tracer or follower wheel 95 is rotatably mounted on a suitable axle bolt 96 on the upright supports 28. The center plane of the tracer wheel lies on the plane of the saw blade. A vertical adjustment bolt 97 is mounted in a threaded hub fixed on each of the supports 28 is used for adjusting the position of the rotational axis of the shaft 96 relative to the carriage to correspond to the positioning of the saw blade relative to the table top, that is, to provide for an adjustment for different amounts of "stick-out" of the saw blade.

The adjustment is made by clamping the axle bolt 96 in position in the slots 98 at the upper ends of the support arms 28. As can be seen, the pattern follower or tracer wheel 95 fits between the two arms, and has a nonmarking elastomeric outer rim member 100.

Figure 3:
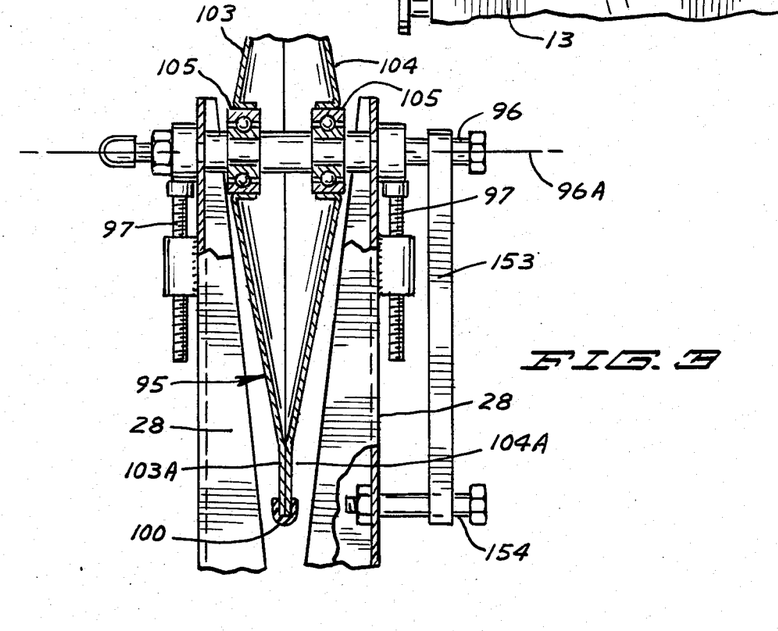
FIG. 3 is a fragmentary sectional view taken as on line 3—3 in FIG. 2.

The tracer wheel has to bear side loads beacuse it moves along the length of the pattern, and thus it is formed, as shown in FIG. 3, by a pair of dished plates 103 and 104 that have formed central hubs in which sealed and prestressed bearings 105 are mounted. The bearings 105 have little play between the inner and outer races, being tightly fitted, but roll easily. By having suitable spacers between the side walls of the arms 28 and the bearings 105, the mounting bolt 96 can be tightened, so that the rotation about the axis 96A is very precise. The dished plates 103 and 104 have outer peripheral flanges 103A and 104A that mate together, and are suitably fixed such as by spot welding to provide for good stability at the outer flanges, around which the elastomeric rim 100 is placed.

The outer rim member 100 prevents marking or scratching the pattern that is used and which are to be duplicated.

The split nut assembly 48 is perhaps best shown in FIGS. 5 and 6. It comprises a pair of plates 110 and 112, respectively, which are held together with a pair of bolts 113, 113 passing through the leg member 46 of the support 45. Suitable resilient spacers 114 are used on opposite sides of the legs 46, and between the respective plates to hold them spaced, as shown. The upper end of each of the plates carries a pair of split nut portions, shown at 116 on the plate 112, and at 117 on the plate 110. These nut portions 116 are made of a suitable plastic material that is relatively low friction and the nut portions are threaded to accept the thread on the threaded portion 60A of the lead screw 60.

The plates 110 and 112 and nut portions 116 and 117 are urged together with a spring-loaded bolt 120 that has springs 121 and 122 bearing against the opposite plates, and which passes between the plates. The spring load holding the nut sections together is adjustable with the nut 123.

For quick adjustment of the carriage relative to the base, a cam lever 125 is used to separate the nut sections to free the lead screw. A can be seen the lever has an actuator with shank portions 127 that are mounted in suitable bushing blocks 126 mounted onto the plate 110. The actuator has a cam center section 128 which is offset from the shank portions, and when the lever is moved as indicated by the arrow 129 in FIG. 5, the cam portion 128 will bear against the plate 112 and force the plate 110 away from the plate 112 against the action of the springs 121. This will release the lead screw 60, so that the thread 60A can be removed or released from the threads in the nut portions, and permit the entire carriage assembly to be slid longitudinally rapidly for bringing it back to a start position, or for setting the tracing wheel 95 in any particular desired location on the pattern 80. The lever 125 is made so it remains in position holding the nut open until it is moved to closed position.

It should be noted that the distance between the rotational center of the pattern, indicated at 135, which is along the axis of the screw 87 and the sprocket 65, and the axis 96A of the tracing wheel 95 is the same as the distance between the rotational center 15 of the saw blade and the rotational axis 137 of the workpiece 81.

As shown in FIG. 4, a plane 145 through the rocker axis 140 of the mounting cap screws 29 for the rocker assembly and extending through the axis 135 of the pattern, is approximately 150° from the plane 146 through the rocker axis 140 and the axis 137. This offset from a plane passing through all the axes 135, 140, 137 is to provide for mounting the workpiece above the saw blade, and to have room for the pattern below the follower or tracer wheel 96 without having excessive height. The plane 147 between the axis 96A of the tracer wheel and rocker axis 140, and the plane 148 between the saw blade axis 15 and the rocker axis 140 are also 150° apart. The angular deviation of the workpiece axis from the plane 147 defined by the pattern axis and rocker axis is duplicated by the amount of the saw blade axis -rocker axis plane 148 from the plane 147 of the rocker axis and the axis of the pattern follower or tracer wheel. This relationship permits precise duplication of the pattern. It is interesting to note that the tangent point of the pattern and tracer wheel is duplicated at the tangent point of the workpiece and saw blade, but the respective radial lines passing through the axes of the pattern and workpiece and such tangent points are at different angles relative to the table top surface. thus, the pattern and workpiece are out of phase in rotation, but in phase with respect to the cutting blade and tracer wheel, respectively. FIG. 4 shows the tangent points of the tracer wheel on the pattern and of the saw blade on the workpiece. The dotted line representation shows the cross section of the pattern and workpiece in the center portions.

Figure 2:
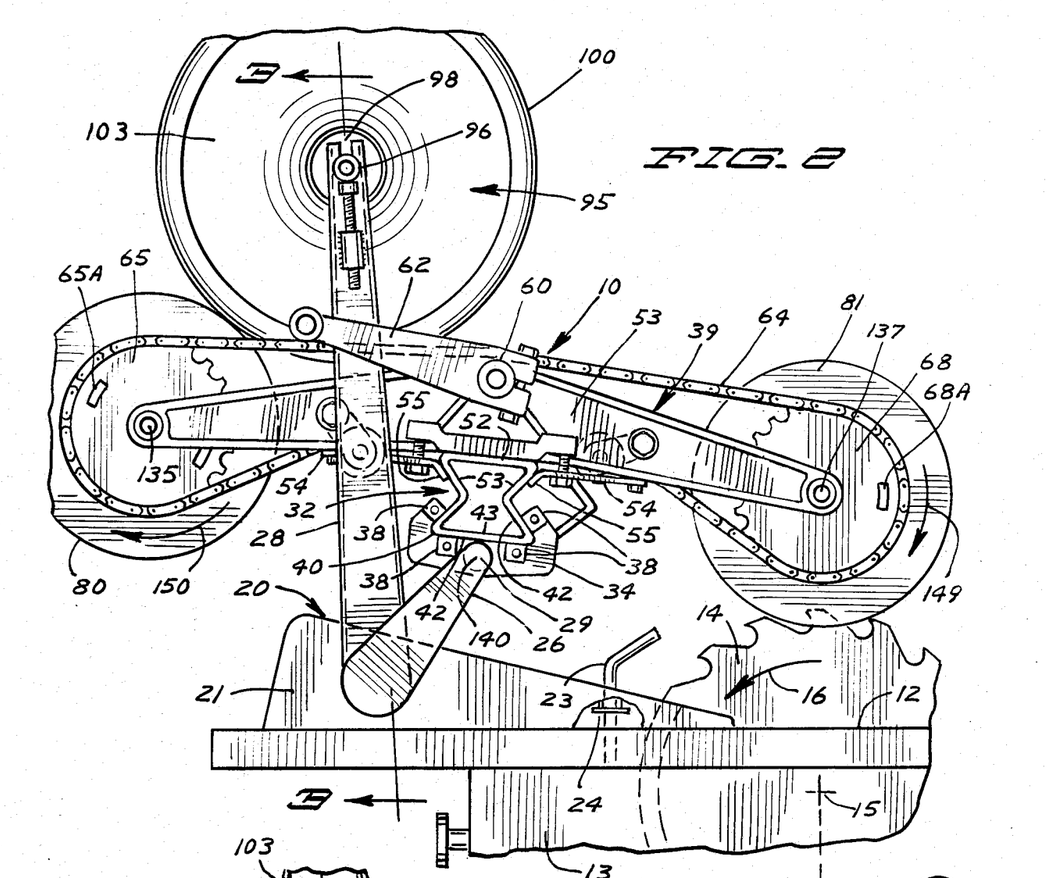
FIG. 2 is a side elevational view taken from the left side in FIG. 1.

The saw blade will be rotating as shown by arrow 16, and workpiece will be rotated by turning the crank so that it rotates in a direction as indicated by the arrow 149. The saw thus makes a "climb cut" on the workpiece giving free cutting action. The pattern 81, of course, will be rotating in the same direction as indicated by the arrow 150 and as the crank 62 is turned in clockwise direction as shown in FIG. 2, the tracer wheel 95 will follow along the outer surface of the pattern, and the saw blade will cut into the workpiece in the outer configuration of the pattern.

The pattern may be held against the workpiece using an elastic band 153 that mounts onto an outwardly extending end of the bolt 96 on one side of the tracer wheel as shown in FIG. 1, and this band 153 is used to loop over the outer end of the arm 44, as shown in FIG. 5, to tend to tilt the rocker assembly and support, and thus the carriage mounted on the torque tube 40 to pull the pattern up against the tracer wheel under an elastic load. If the workpiece is substantially heavier than the pattern so contact of the pattern and tracer wheel is assured, then the rubber band is not necessary. When the rubber band 153 is not used, it is placed over a stud 154 that is mounted onto one of the upright support arms 28, and thus the band is held out of the way as shown in FIG. 3.

The tracer wheel 95 is selected to be the same size as the saw blade, generally either a 10" or an 8" blade, and the center axis 96A of the tracer wheel 95 is adjusted to compensate for the amount that the blade sticks out above the top of the table in the initial setup. A template can be used for making this adjustment by marking the amount that the saw protrudes above the surface of the table and then accommodating that by setting the desired relationship by changing to the position of the tracer wheel above the table.

A pattern, such as the pattern 80, prepared with the bracket 75 and the lathe center and placed between the tailstock and headstock, and then a corresponding suitable sized workpiece (for example, a round log having the suitable diameter) is placed on the center mounting axis of the workpiece ends between the head and tailstock, again using the bracket 75 for driving the workpiece. It should be noted that in addition to the bracket 75, the pattern and workpiece are both mounted on center points at the headstock ends. The rubber band 153 is placed on the arm 44 to urge the pattern against the outer edge of the tracer wheel 95. It is of interest to note that when, for example, a wide part of the pattern is facing up, that same wide part of the workpiece is facing generally down, facing the saw blade, and also out of phase, as previously mentioned.

Generally before the saw blade is extended, the pattern is checked out by turning the crank to run the tracer wheel across the pattern to observe the rocking motion of the carriage and also the lateral travel of the carriage as it moves along the pattern, as controlled by the lead screw 60. Note also that the pattern will be rotationally driven by the drive chain and the sprocket 65.

Once the pattern 80 has been moved so that the tracer wheel is at one end, the lead screw can be disengaged from the nuts by opening the two plates, and the pattern and carriage then can be slid manually to a desired starting location which may vary from pattern to pattern and which may be slightly in from one end of the pattern or the workpiece. Again, there should be some base area left on the workpiece as shown in the FIG. 1, so the pattern will be started slightly in from its end. Usually it is desirable to start cuts at the tailstock end so the the drive end is not cut away first.

The lead screw 60 is reengaged with the nut sections by turning the cam lever on the split nut, and then the saw blade would be raised to a desired location slightly below its final location, to make an initial cut.

The saw blade would be started with the pattern held away from the follower wheel so that the workpiece is clear of the saw blade. Slowly the pattern would be tilted back to contact the tracer wheel and the saw blade would now be in contact with the workpiece. First a rough cut is made by cranking the crank so that the workpiece is fed into the saw blade and a roughing of the pattern is made. The unit is shown at maximum diameter in solid lines, but in FIG. 4 a dotted line 160 is shown to represent a surface of the pattern. When such line is against the tracer wheel the workpiece will move into the saw blade as shown at dotted line 161. The saw would be stopped when the first cut is made, the lead screw would be disengaged by opening the split nut and the carriage would be slid back to its starting point. The saw blade then would be raised approximately one-half of the distance to its final cut, with the pattern held away from the tracer wheel, and as before, the saw would be started and the pattern would be reengaged with the follower wheel so that the saw blade would be taking a new cut.

The carriage is moved to move the pattern across the tracer wheel, which again, follows the pattern configuration with a rocking motion of the pattern and workpiece and a movement of the carriage axially along the screw at the same time, to make a spiral cut. This process can be repeated then with smaller cuts to have a more finished final cut. It may be desirable to leave a small amount of material such as approximately 1/16" for hand finishing. After the cut has been made to the desired size with the workpiece, the workpiece is removed and finished in a desired manner. If desired, one pass will work for cutting a workpiece if the pattern is not slender.

The device will provide for substantial lengths of pattern and workpiece by changing the length of the torque tube 40 of the carriage, and moving the tailstock farther from the headstock using the clamps provided. In each instance, however, some type of a drive lug would be used on the pattern and workpiece for engaging the drive sprocket, and this is done in a conventional manner. The unit is easy to use, and with proper precautions normal for saw blades, it is safe to use. The type of pattern is up to the selection of the user, and the outer configuration can quickly be cut to a desired configuration following the pattern, and the smoothness of the cut depends on the amount of engagement of the saw, and the relative speeds of movement of the pattern and saw blade.

It should be noted that torsional deflection of torque tube 40 which may cause the headstock and tailstock ends to twist relative to each other causes negligible errors because the saw blade and tracer wheel are substantially coplanar. Thus deflection errors are minimized.

The assembly is self contained and easily removed and replaced onto the table saw. The entire assembly also is easily stored.

Although the present invention has been described with reference to preferred embodiments, workers skilled in the art will recognize that changes may be made in form and detail without departing from the spirit and scope of the invention.

What is claimed is:

1. For use in combination with a circular saw assembly having a saw table with a table surface, and a saw blade rotatable about an axis generally parallel to the table surface protruding above the table surface, a carving attachment including:

a base mountable on a table surface of a saw table adjacent to said saw blade;

a carriage mounted on said base for rocking movement about a rocker axis generally transverse to the plane of the saw blade, said carriage including headstock means and tailstock means spaced apart along said carriage, said headstock means and tailstock means each comprising arms extending transversely to the rocker axis so that when mounted on a saw table first ends of each of the headstock and tailstock arms are on an opposite side of the rocker axis from the saw balde, and second ends of the headstock and tailstock arms are adjacent a saw blade of a circular saw assembly on which the carving attachment is mounted with a plane of such saw blade between the headstock and tailstock arms, respectively;

first means to support a pattern between the first ends of the headstock and tailstock arms;

second means to support a workpiece between second ends of said headstock and tailstock arms, with the workpiece generally above the cutting edge of the saw blade of a circular saw assembly on which the carving attachment is mounted;

a pair of upright arms mounted on the base between the headstock and tailstock arms;

a tracer wheel mounted on the upright arms in position to engage a pattern held between the first ends of the headstock and tailstock arms and rotatably mounted about an axis that is fixed relative to the base and above the table surface on which the base is mounted, said tracer wheel comprising a pair of dish-shaped plates spaced apart to have a maximum width dimension along the axis of rotation adjacent such axis of rotation, and said plates tapering in toward a bisecting plane at the outer rim of the plates, said plates being fixed together at the outer rim to form a narrow edge for engaging a pattern;

means for simultaneously rotating the first means and second means, and;

separate means driven with the means to rotate to move said carriage in direction generally along the rocker axis at the same time the means to rotate is operated, whereby as the tracer wheel follows a pattern held in the headstock and tailstock arms, the carriage will tilt about the rocker axis, and will be moved in direction along the rocker axis.

2. The apparatus as specified in claim 1 wherein said separate means comprises a lead screw mounted between said base and said carriage, where upon rotation of said lead screw, the carriage is moved in direction along the rocker axis relative to the base and relative to the table of a table saw on which the base is mounted.

3. The apparatus as specified in claim 2 wherein said means to mount a workpiece on the second end of the headstock arm comprises a first sprocket, and the means to mount a pattern at the first end of said headstock arm comprises a second sprocket, the means to simultaneously rotate further comprising a drive sprocket mounted for rotation with said lead screw, and a chain engaging said drive sprocket and both of said first and second sprockets for rotating the first and second sprockets simultaneously with rotation of the lead screw.

4. The apparatus as specified in claim 1 wherein said headstock and tailstock means each have means to permit adjustment thereof relative to each other in direction along the rocker axis.

5. The apparatus as specified in claim 1 wherein said carriage comprises a torque tube, the torque tube being elongated in direction along the rocker axis, and having a cross section which forms overhanging edge portions to permit clamping the headstock and tailstock means to the torque tube.

6. The apparatus as specified in claim 5 wherein said carriage further includes a rocker assembly for supporting said torque tube, said rocker assembly having means for slidably guiding said torque tube for sliding movement in direction along the longitudinal axis of the torque tube relative to the rocker assembly as the lead screw is rotated.

7. The apparatus as specified in claim 2 and nut means for receiving said lead screw, said nut means being fixedly mounted with respect to said base to provide a reaction point for threadable movement of the lead screw, said nut means comprising a split nut having first and second sections biased together to a working position for threadable. engagement of the lead screw, and means for moving the first and second portions apart to disengage the nut means from the lead screw to permit sliding the carriage relative to the nut means.

8. The apparatus as specified in claim 1 and resilient means to urge a pattern held in the first ends of the headstock and tailstock arms against the tracer wheel under a desired force.

9. The apparatus of claim 1 wherein the plate members have flat rim flanges perpendicular to the axis of rotation of the tracer wheel at the outer rim, and an antimarking resilient rim around the edge of said flanges for engagement with said pattern.

10. The apparatus as specified in claim 9 wherein said tracer wheel has prestressed bearings mounted at the hub of said tracer wheel for rotatably supporting said tracer wheel relative to the upright support.

11. The apparatus as specified in claim 1 wherein the tracer wheel bisecting plane lies on the plane of a saw blade of a saw table on which the base is mounted.

12. An apparatus for supporting a pattern and workpiece on a table saw having an upper working surface in position so the workpiece will be engaged by a rotating saw blade of such table saw comprising:

a base mountable on a table surface adjacent to a saw blade on the table;

a carriage mounted on said base for rocking movement about a rocker axis, said carriage including headstock means and tailstock means spaced apart along said carriage, said headstock means and tailstock means each comprising arms extending transverse to he rocker axis and extending on opposite sides of the rocker axis, and being above the base;

first means to rotatably support a pattern on the first ends of the arms positioned above the working surface of a saw on which the base is mounted;

second means to rotatably support a workpiece on second ends of said arms with a supported workpiece above a saw blade of a table saw on which the base is mounted;

a tracer wheel rotatably mounted on the base in position to engage a pattern held between the first end of the headstock and tailstock arms, said tracer wheel being fixed against lateral movement and having a center plane of rotation coinciding with the plane of a saw blade of a table on which the base is mounted;

said first and second means including drive means to simultaneously rotate the first and second means about parallel axes of rotation, the first and second means being configured such that the smallest included angle between a first plane defined by the rocker axis and the axis of rotation of the second means is less than 180° when measured on sides of said planes facing upwardly, to thereby permit a workpiece supported on the second means to be a desired amount above a saw blade of a table saw on which the base is mounted and to permit a pattern supported on the second means to be desired amount above the working surface of such a table saw; and third means coupled to the drive means to move said carriage in direction generally along the rocker axis, said tracer wheel being above the axis of rotation of the pattern.

13. The apparatus as specified in claim 12 wherein said first drive means comprises first and second sprockets on the first and second ends of the tailstock arm, said third means comprising a lead screw and a nut, the nut being fixed relative to the base, and the lead screw being rotatably mounted on the carriage, a drive sprocket drivably mounted on said lead screw, and a chain engaging said drive sprocket and both of said first and second sprockets for rotating the first and second sprockets simultaneously with rotation of the lead screw.

14. The apparatus as specified in claim 12 wherein said carriage comprises a torque tube, the torque tube being elongated in direction along the rocker axis, and having a tubular cross section with top and bottom walls having parallel spaced first and second surfaces facing upwardly and downwardly when in position on a table saw, and side walls joining the top and bottom walls, said side wall being formed into V shapes extending toward the tube axis to form overhanging edge portions at the top wall edges to permit clamping the headstock and tailstock means to the torque tube.

15. The apparatus as specified in claim 14 wherein said carriage further includes a rocker assembly for supporting said torque tube, said rocker assembly having means for slidably guiding the lower edge portions of said torque tube formed by the edges of the bottom wall and side wall for sliding movement in direction along the longitudinal axis of the torque tube relative to the rocker assembly as the lead screw is rotated.

16. The apparatus of claim 12 wherein the smallest inluded angle between a third plane defined by the rocker axis and the axis of rotation of the tracer wheel and a fourth plane defined by the rocker axis and the axis of rotation of a saw blade of a table saw on which the base is mounted is substantially equal to the smallest included angle between the first and second planes.

* * * * *

UNITED STATES PATENT AND TRADEMARK OFFICE
CERTIFICATE OF CORRECTION

PATENT NO. : 4,627,772
DATED : December 9, 1986
INVENTOR(S) : Paul S. Petersen

It is certified that error appears in the above-identified patent and that said Letters Patent is hereby corrected as shown below:

In Column 11, Claim 12, line 15, please delete the word "he" and insert --the--.

In Column 11, Claim 12, line 36, after the word "the", please insert --first means and a second plane defined by the rocker axis and the axis of rotation of the--.

Signed and Sealed this

Twenty-fourth Day of March, 1987

*Attest:*

DONALD J. QUIGG

*Attesting Officer*  *Commissioner of Patents and Trademarks*